US011748373B2

(12) United States Patent
Breed et al.

(10) Patent No.: US 11,748,373 B2
(45) Date of Patent: Sep. 5, 2023

(54) SYSTEMS AND METHODS FOR GENERATING SERVICE AREAS

(71) Applicant: SMS ASSIST, L.L.C., Chicago, IL (US)

(72) Inventors: D. Anthony Breed, Chicago, IL (US); Lavanya Santhanakrishnan, Chicago, IL (US)

(73) Assignee: SMS ASSIST, L.L.C., Chicago, IL (US)

(*) Notice: Subject to any disclaimer, the term of this patent is extended or adjusted under 35 U.S.C. 154(b) by 0 days.

(21) Appl. No.: 17/811,967

(22) Filed: Jul. 12, 2022

(65) Prior Publication Data

US 2023/0017501 A1    Jan. 19, 2023

Related U.S. Application Data

(60) Provisional application No. 63/221,352, filed on Jul. 13, 2021.

(51) Int. Cl.
*G06F 16/00* (2019.01)
*G06F 16/26* (2019.01)
*G06F 16/29* (2019.01)
*G06Q 10/0631* (2023.01)

(52) U.S. Cl.
CPC .............. *G06F 16/26* (2019.01); *G06F 16/29* (2019.01); *G06Q 10/06315* (2013.01)

(58) Field of Classification Search
CPC .... G06F 16/26; G06F 16/29; G06F 16/90328; G06F 16/27; G06Q 10/06315
See application file for complete search history.

(56) References Cited

U.S. PATENT DOCUMENTS 10,593,074 B1\* 3/2020 Friedman ............ G06F 3/04842
2008/0244429 A1 10/2008 Stading
2009/0132511 A1 5/2009 Yang
(Continued)

FOREIGN PATENT DOCUMENTS

EP       3133510 A1    2/2017

OTHER PUBLICATIONS

International Search Report and Written Opinion in International Patent Application No. PCT/US2022/036837, dated Oct. 10, 2022 (10 pages).

*Primary Examiner* — Dinku W Gebresenbet
(74) *Attorney, Agent, or Firm* — Nixon Peabody LLP

(57) ABSTRACT

Apparatuses and methods are provided herein useful to generating service areas. A system for generating service areas comprises a database configured to store location identifiers, and a control circuit configured to generate a user interface including an interactive map, receive, from a user, first user input, wherein the first user input indicates boundaries drawn within the interactive map, generate, based on the first user input, a boundary shape, augment the interactive map to include the boundary shape, determine, based on accessing the database, one or more location identifiers associated with the first user input, generate, based on the first user input and the one or more location identifiers, a location identifiers presentation, augment the interactive map to include the location identifiers presentation, and cause presentation, via a display device, of the interactive map including the boundary shape and the location identifier presentation.

14 Claims, 14 Drawing Sheets

(56) References Cited

U.S. PATENT DOCUMENTS

| | | | |
|---|---|---|---|
| 2016/0344801 A1* | 11/2016 | Akkarawittayapoom | ................... G06F 16/972 |
| 2019/0034966 A1* | 1/2019 | Zaheer | ............... G06Q 30/0261 |
| 2019/0385453 A1 | 12/2019 | Dorne | |
| 2020/0275235 A1* | 8/2020 | Akhoondi | ............. H04L 67/303 |
| 2022/0014895 A1* | 1/2022 | Horelik | .............. G08B 21/0261 |

* cited by examiner

US 11,748,373 B2

SYSTEMS AND METHODS FOR GENERATING SERVICE AREAS

TECHNICAL FIELD

This invention relates generally to the provision of services and, more specifically, computer systems for the provision of services.

BACKGROUND

Many service providers provide services for specific geographic regions. Service providers typically make rough estimates of their service areas based on geographic boundaries, such as zip codes, cities, states, etc. However, it can be difficult for a service provider to quickly and accurately visualize a service area based on such geographic boundaries. Such difficulties can result in service areas that are too large or too small. If the service area is too large, the service provider may not be able to efficiently cover the entire service area, resulting in diminished customer satisfaction. Conversely, if the service area is too small, the service provider may miss out on potential business and the opportunity to efficiently aid those in need. Accordingly, a need exists for systems and methods to generate service areas for service providers.

BRIEF DESCRIPTION OF THE DRAWINGS

Disclosed herein are embodiments of systems, apparatuses, and methods pertaining to generating service areas. This description includes drawings, wherein.

Figure 1:
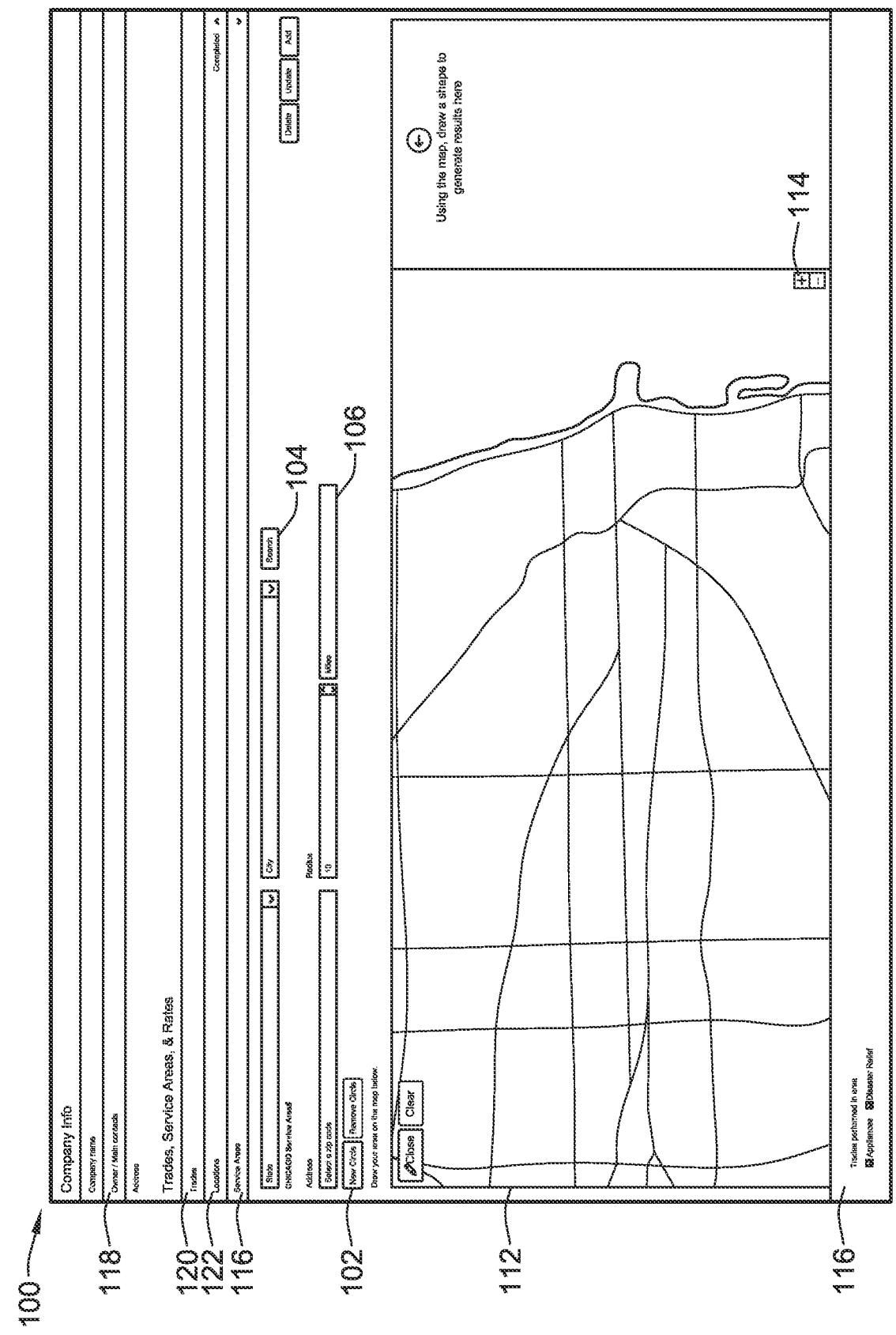
FIG. 1 depicts a user interface 100 including an interactive map 112, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

Generally speaking, pursuant to various embodiments, systems, apparatuses, and methods are provided herein useful to generating service areas. In some embodiments, a system for generating service areas comprises a database, wherein the database is configured to store location identifiers, and a control circuit, wherein the control circuit is communicatively coupled to the database, and wherein the control circuit is configured to generate a user interface, wherein the user interface includes an interactive map, receive, from a user, first user input, wherein the first user input indicates boundaries drawn within the interactive map, generate, based on the first user input, a boundary shape, augment the interactive map to include the boundary shape, determine, based on accessing the database, one or more location identifiers associated with the first user input, generate, based on the first user input and the one or more location identifiers, a location identifiers presentation, augment the interactive map to include the location identifiers presentation, and cause presentation, via a display device, of the interactive map including the boundary shape and the location identifier presentation.

As previously discussed, many service providers service specific geographic regions. Service providers seek to accurately provide service areas so ensure that the service area is neither to large nor too small, among other considerations. Unfortunately, current techniques do not provide service providers with the ability to quickly and accurately visualize a service area based on geographic boundaries and/or create service areas.

Described herein are systems, methods, and apparatuses that can generate service areas for service providers that allow service providers to visualize a service area quickly and accurately. In one embodiment, a user can provide user input to draw boundaries within an interactive map of a user interface. This user input provides unstructured geospatial information to the system. The system translates the boundaries into geographic locations and augments the interactive map. That is, the system converts the unstructured geospatial information into structured geospatial regions and augments the interactive map to provide a visualization of the structured geospatial regions. In some embodiments, the augmented interactive map presents the boundaries, as defined by the user, as well as a location identifiers presentation that is based on the geographic locations associated with the boundaries. The discussion of FIGS. 1-10 provides an overview of the functionality of such systems, methods, and apparatuses.

FIG. 1 depicts a user interface 100 including an interactive map 112, according to some embodiments. The user can provide information, via the user interface, about their business and the services their business provides. For example, the user can provide company information and trades information. The company information can include, for example, company name, the country in which the company is headquartered, the countries in which the company operates, a type of the company, states in which the company operates and/or is licensed, ownership information, contact information, address information, etc. The trades information can include, for example, types of clients served (e.g., commercial, retail, residential, etc.), trades performed (e.g., appliances, food and beverage, doors, electrical, fire systems, flooring, fuel systems, gates, grilles, general maintenance, glass, HVAC, janitorial, kitchen equipment, landscaping, locks, parking lot services, pest control, plumbing, portable restrooms, refrigeration, roof, snow removal, etc.), subtrades, etc. In some embodiments, the user inputs company information and trade information as part of an onboarding process. This information can be provided in, for example, dedicated sections of the user interface 100 (e.g., a company information section 118, a trades section 120, a locations section 122, etc.).

As depicted in FIG. 1, the user interface 100 includes a service areas section 116. The service areas section 116 includes search selection 104, an address input selection 106, and the interactive map 112. In some embodiments, the user can search for areas by state and/or city with the search selection 104 and/or input address via the address input selection 106. The interactive map 112 is interactive in that a user can, for example, zoom (e.g., using zoom controls 114), pan, or otherwise manipulate the interactive map 112. In one embodiment, the user can provide user input to indicate boundaries on the interactive map 112 (described in more detail with respect to FIGS. 2 and 3). The user can provide such user input by, for example, selecting a create boundaries selection 102.

Figure 2:
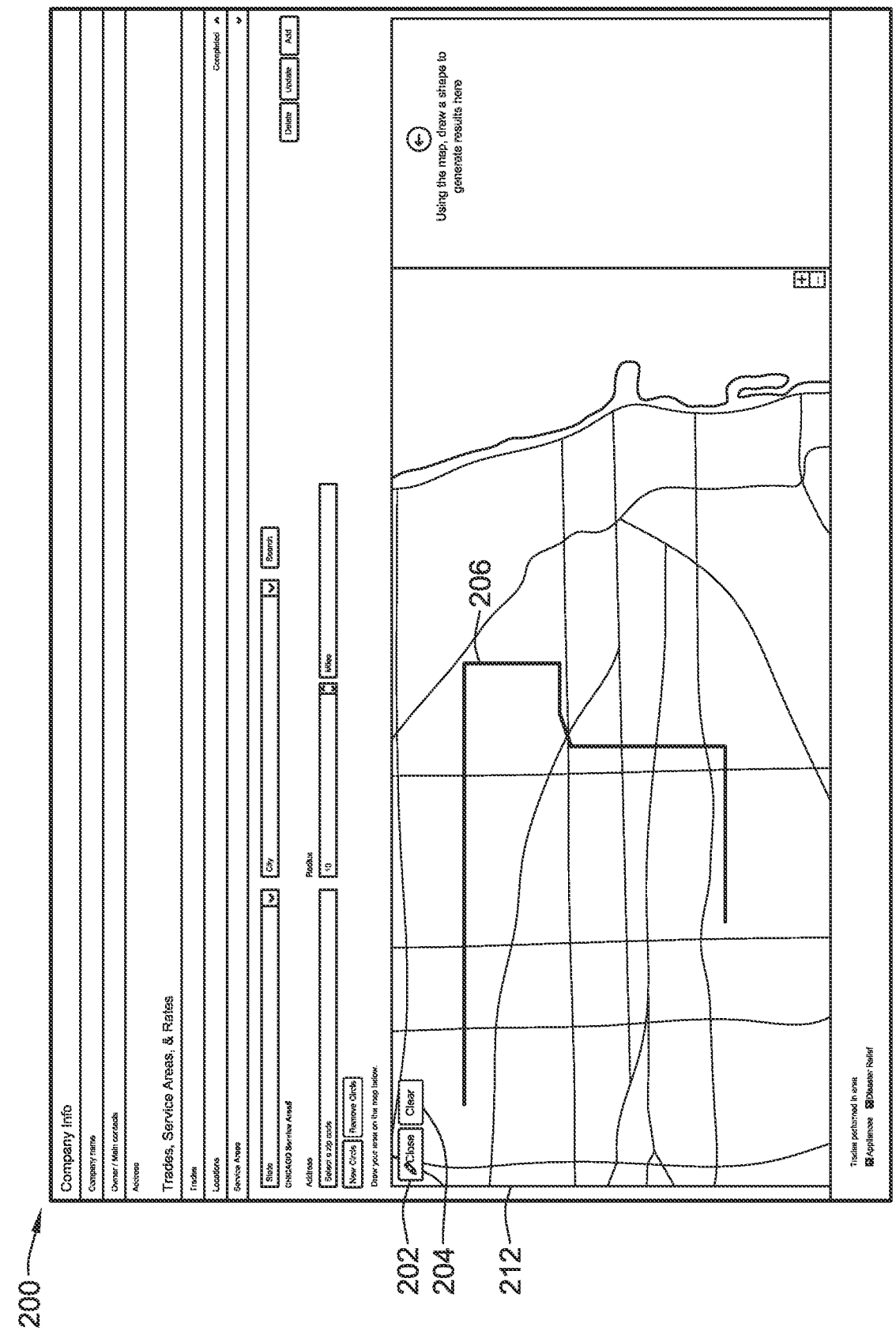
FIG. 2 depicts a user interface 200 including an interactive map 212 in which a user is providing user input to generate boundaries 206, according to some embodiments.
Figure 3:
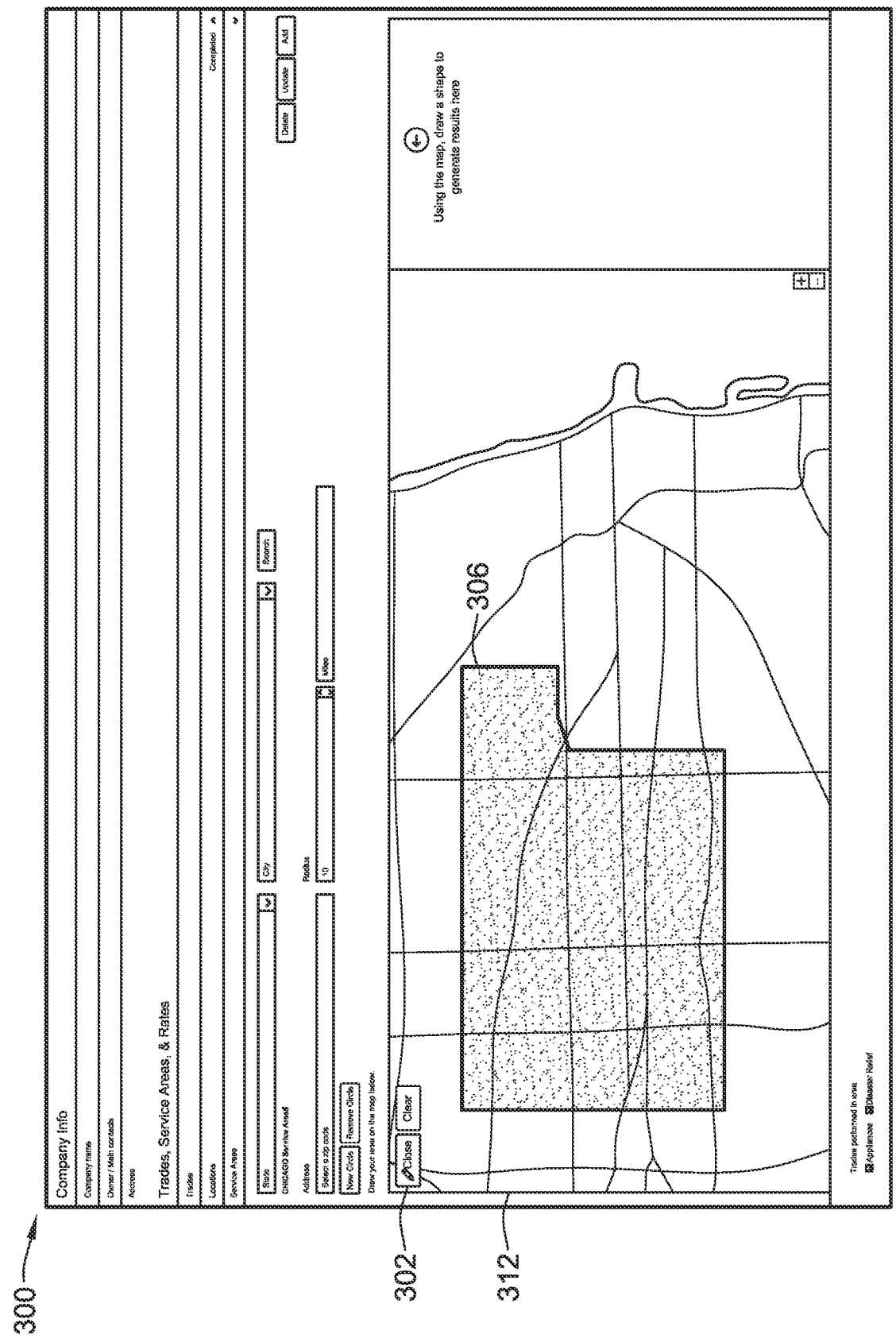
FIG. 3 depicts a user interface 300 including an interactive map 312 that has been augmented with a boundary shape 306, according to some embodiments.

While the discussion of FIG. 1 provides an overview of a user interface for creating service areas, the discussion of FIGS. 2 and 3 provides additional detail regarding such a user interface. Specifically, FIG. 2 describes the creation of boundaries via user input.

FIG. 2 depicts a user interface 200 including an interactive map 212 in which a user is providing user input to generate boundaries 206, according to some embodiments. The user can provide the user input in any suitable manner, for example, based on a type of user device that the user is using. Likewise, the user device can take any suitable form. For example, the user device can be a desktop computer, a laptop computer, a smartphone, a tablet computer, a personal digital assistance (PDA), a wearable smart device (e.g., a smartwatch), etc. In one embodiment, the user device is a computer. In such embodiments, the user can use a mouse or trackpad to draw the boundaries 206 on the interactive map. For example, the user can click points on the map to designate the points as vertices of the boundaries 206, click and drag to draw the boundaries 206, etc. The boundaries 206 can be straight and/or curved.

The boundaries 206 represent unstructured geospatial information. The boundaries 206 represent unstructured geospatial information in that they are not tied to any specific geographic features (e.g., zip codes, cities, counties, states, addresses, roads, rivers, lakes, mountains, etc.). Rather, the boundaries 206 are drawn by a user to indicate a desired service area. Additionally, or alternatively, in some embodiments, the user can also provide structured geospatial information as an input. For example, as discussed with respect to FIG. 1, the user can provide input selecting a city, county, state, country, zip code, etc. This structured geospatial information can be used in concert with, or in lieu of, the unstructured geospatial information provided by the user via the boundaries 206 to form one or more boundary shapes, as described in more detail with respect to FIG. 3.

The user interface 200 also includes a close selection 202 and a clear selection 204. The close selection 202 finalizes the boundaries 206 that the user has drawn. If the boundaries 206 form a closed shaped (e.g., as shown in FIG. 3), selection of the close selection 202 will finalize the boundaries 206. In some embodiments, if the boundaries 206 do not form a closed shape (e.g., as shown in FIG. 2), selection of the close selection 202 can cause the boundaries 206 to be closed automatically and finalized. The boundaries 206 can be closed automatically based on any suitable algorithm. For example, the boundaries 206 can be closed by adding any additional boundaries 206 that closes the boundaries 206 in the shortest path, following major roads, conforming to existing geographic regions (e.g., city, state, county, zip code, etc. boundaries), conforming to existing geographic features (e.g., roads, rivers, lakes, oceans, mountains, canyons, etc.). The clear selection 204 removes boundaries that were previously drawn from the interactive map 212.

After the boundary is finalized, the interactive map 212 is augmented to include a boundary shape, as depicted in FIG. 3.

FIG. 3 depicts a user interface 300 including an interactive map 312 that has been augmented with a boundary shape 306, according to some embodiments. The boundary shape 306 corresponds to the boundaries created by the user (e.g., as depicted in FIG. 2) and/or any structured geospatial information provided by the user. If the user is done creating boundaries, the user can select a done selection 302. The boundary shape can take any suitable shape and include straight and/or curved boundaries.

Figure 4:
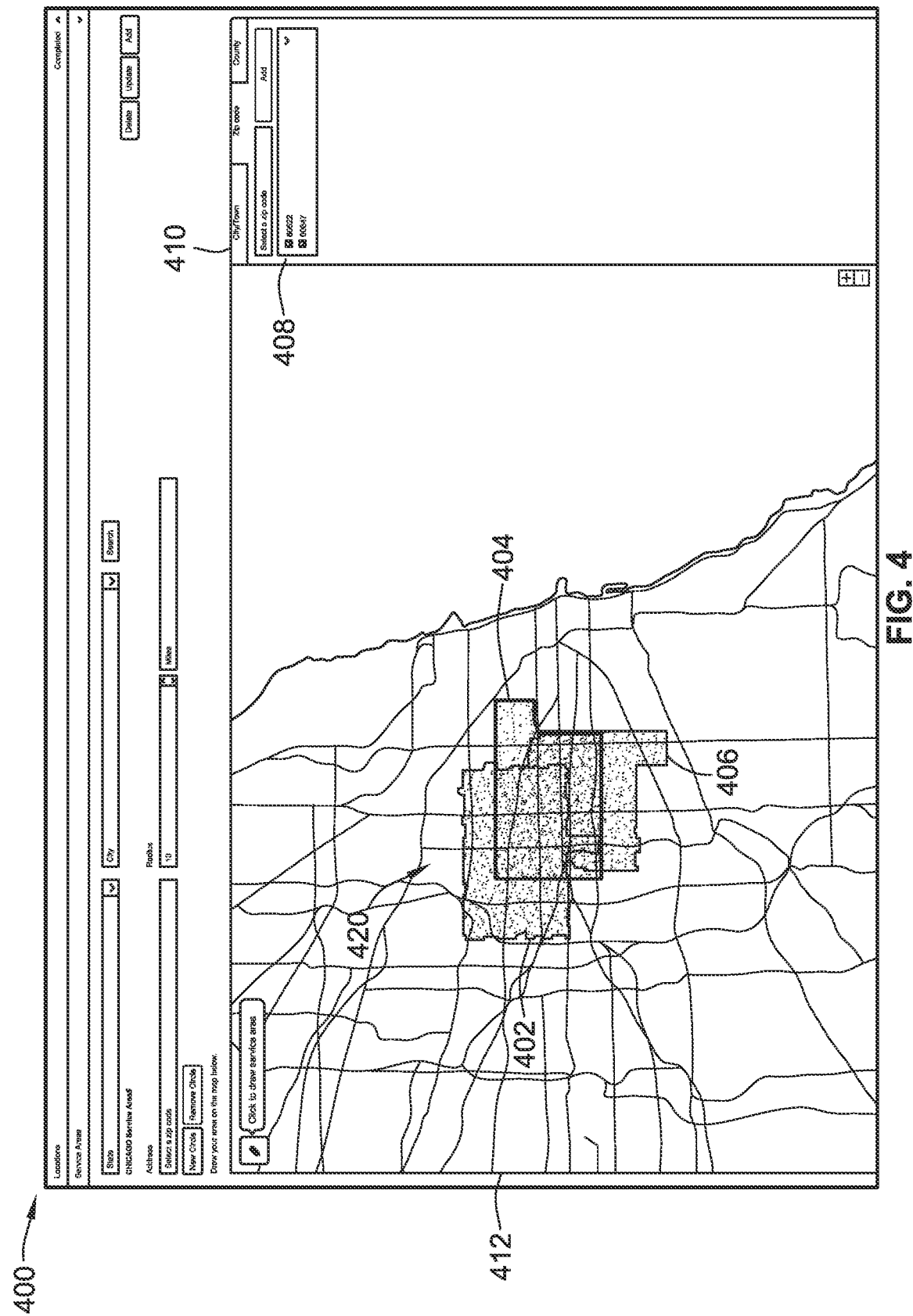
FIG. 4 depicts a user interface 400 including an interactive map 412 that has been augmented with a boundary shape 404 and a location identifiers presentation, according to some embodiments.

Selection of the done selection 302 causes the interactive map 312 to be augmented with location identifier presentation(s), as depicted in FIG. 4. The location identifiers can be any suitable type of structured geospatial information (e.g., zip codes, states, towns, cities, countries, etc.).

FIG. 4 depicts a user interface 400 including an interactive map 412 that has been augmented with a boundary shape 404 and a location identifiers presentation 420, according to some embodiments. The relevant location identifiers are those that are associated with the boundaries drawn by the user (i.e., the user input provided to generate the boundaries). As depicted in FIG. 4, the boundaries drawn by the user create a boundary shape 404. The boundary shape 404 includes geographic regions associated with two primary zip codes: 1) zip code 60622, and 2) zip code 60647. Although the location identifiers depicted in FIG. 4 are associated with zip codes, such is not required. For example, the location identifiers can be associated with cities, counties, states, etc. The location identifiers presentation 420 includes a first portion 406 and a second portion 402. The first portion 406 is associated with the zip code 60622 and the second portion 402 is associated with the zip code 60647.

The relevant location identifiers represent structured geospatial information associated with the boundary shape 404

(i.e., the unstructured geospatial information). As previously noted, the relevant location identifiers are those that are associated with the boundaries drawn by the user. Accordingly, any suitable algorithm and/or metrics can be used to determine the relevant location identifiers. For example, a location identifier can be associated with the boundary shape 406 based on their inclusion within the boundary shape 406, a threshold portion of a region associated with location identifier being within the boundary shape 406 (e.g., greater than 25% of the location identifier within the boundary shape 406, greater than 50% of the location identifier with the boundary shape 406, etc.), a proximity of the location identifier to the boundary shape (e.g., within two blocks of the boundary shape 406, within one mile of the boundary shape 406, etc.), etc.

The user interface 400 also includes selections 410 that allow a user to modify the location identifiers included in the location identifier presentation 420 (and thus the service area). The selections 410 can include a city/town selection, a zip code selection, a country selection, or any other suitable selections. As depicted in FIG. 4, the user has selected the zip code selection. The zip code selection includes toggles 408 that allow a user to select and/or deselect one or more of the location identifiers (i.e., zip codes in the example depicted in FIG. 4).

Figure 5:
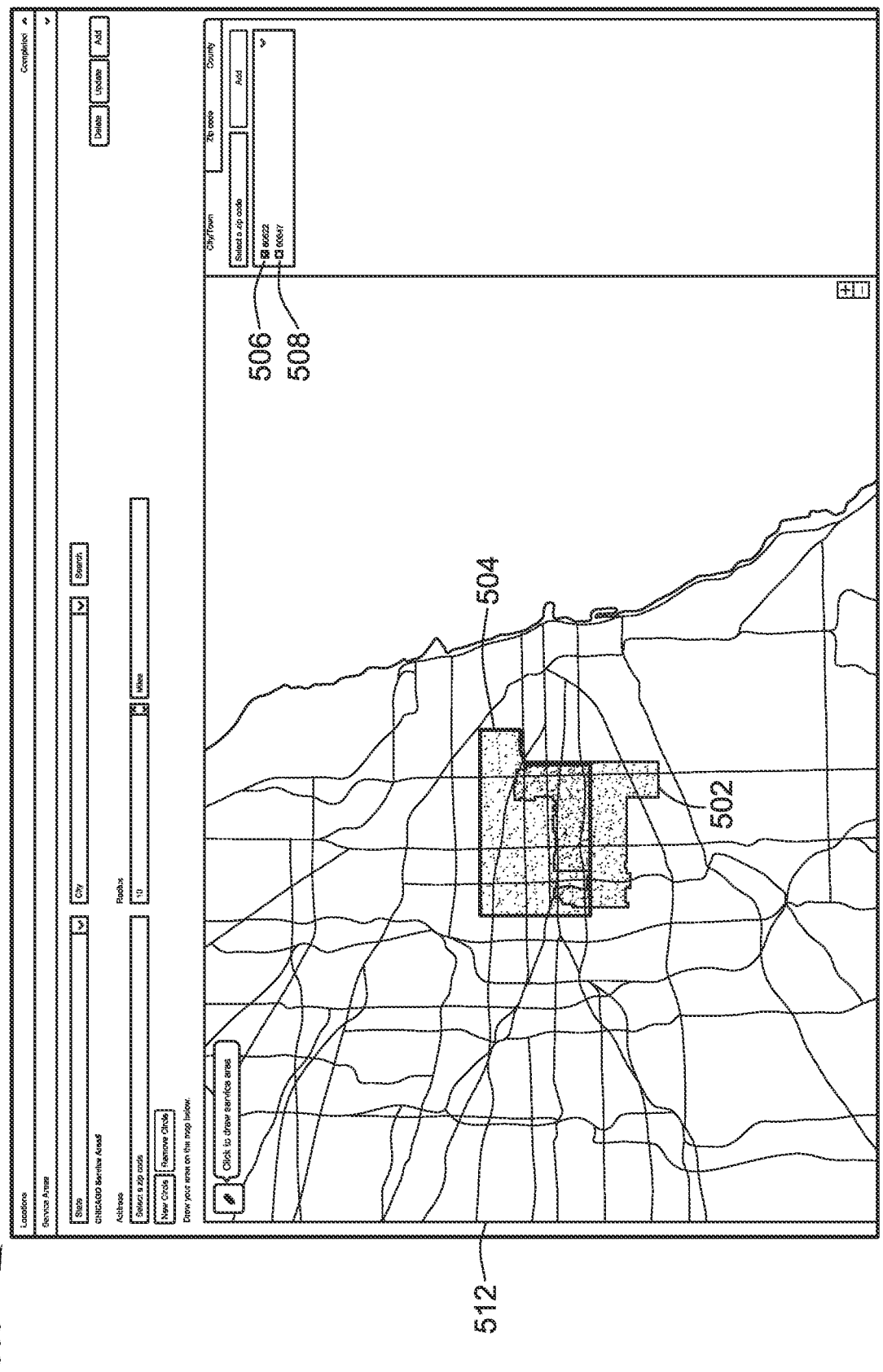
FIG. 5 depicts a user interface 500 including an interactive map 512 in which a user has deselected an indication of a location associated with a location identifier, according to some embodiments.

As shown in FIG. 5, the user has deselected the toggle 408 associated with the zip code 60647.

FIG. 5 depicts a user interface 500 including an interactive map 512 in which a user has deselected an indication of a location associated with a location identifier, according to some embodiments. As depicted in FIG. 5, the user has deselected a first toggle 508. The first toggle 508 is associated with the zip code 60647. Accordingly, the interactive map 512 no longer includes the portion of a locations identifiers presentation 502 that includes a portion associated with the zip code 60647. That is, the interactive map 512 is updated to not include a portion of the location identifiers presentation associated with the zip code 60647.

As depicted in FIG. 5, the user has not deselected a second toggle 506. The second toggle 506 is associated with the zip code 60622. Accordingly, the locations identifiers presentation 502 includes a portion associated with the zip code 60622.

While the discussion of FIGS. 1-5 describes use of a single boundary shape, embodiments are not so limited. For example, as depicted in FIGS. 6-7, a user has created multiple boundary shapes.

Figure 6:
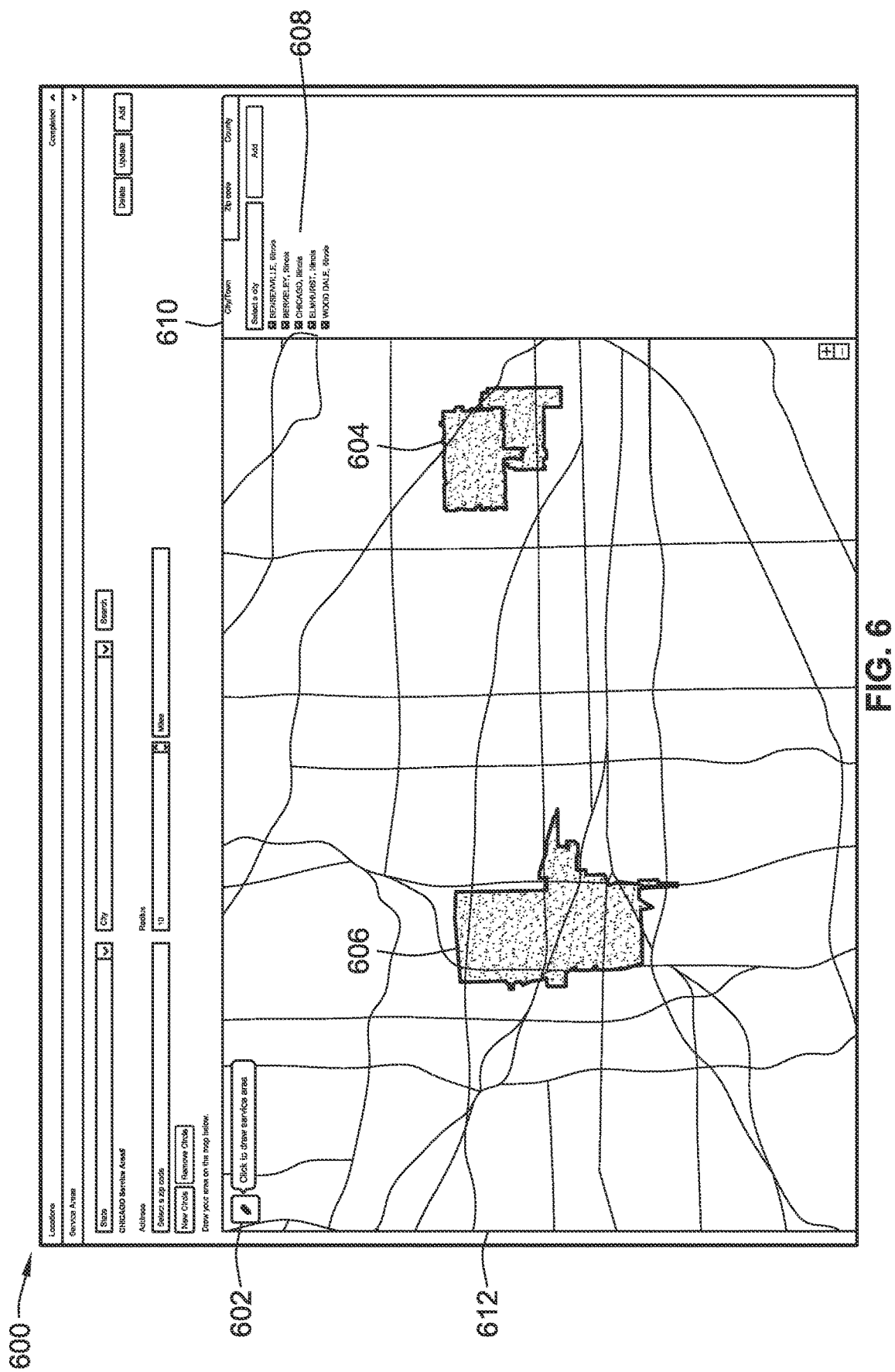
FIG. 6 depicts a user interface 600 including an interactive map 612 including a location identifiers presentation covering multiple geographic areas, according to some embodiments.

FIG. 6 depicts a user interface 600 including an interactive map 612 including a location identifiers presentation covering multiple geographic areas, according to some embodiments. As depicted in FIG. 6, the location identifiers presentation includes a first region 606 and a second region 604. The first region 606 is associated with a first boundary shape (not shown) drawn by a user and the second region 604 is associated with a second boundary shape (not shown) drawn by the user. As depicted in FIG. 6, the first region 606 and second region 604 are geographically separate (e.g., the first region 606 and the second region 604 do not touch and do not overlap). However, such is not required. For example, one or more of the regions may touch and/or overlap. Additionally, though the example depicted in FIG. 6 includes two regions, embodiments are not so limited. That is, the interactive map can include as many regions (i.e., location identifiers presentations and/or boundary shapes) as desired by the user. For example, if the user wishes to add another region, they can use the new area button 602.

The user interface 600 also includes selections 610 that allow a user to modify the location identifiers included in the location identifier presentation (and thus the service area). In the example depicted in FIG. 6, the user has selected the city/town selection. The city/town selection includes a list of cities and/or towns (i.e., location identifiers) that are associated with the boundary shape(es). Each of the cities and/or towns includes a toggle 608. The user can select the toggles 608 to select and/or deselect one or more of the cities and/or towns, as depicted in FIG. 7.

Figure 7:
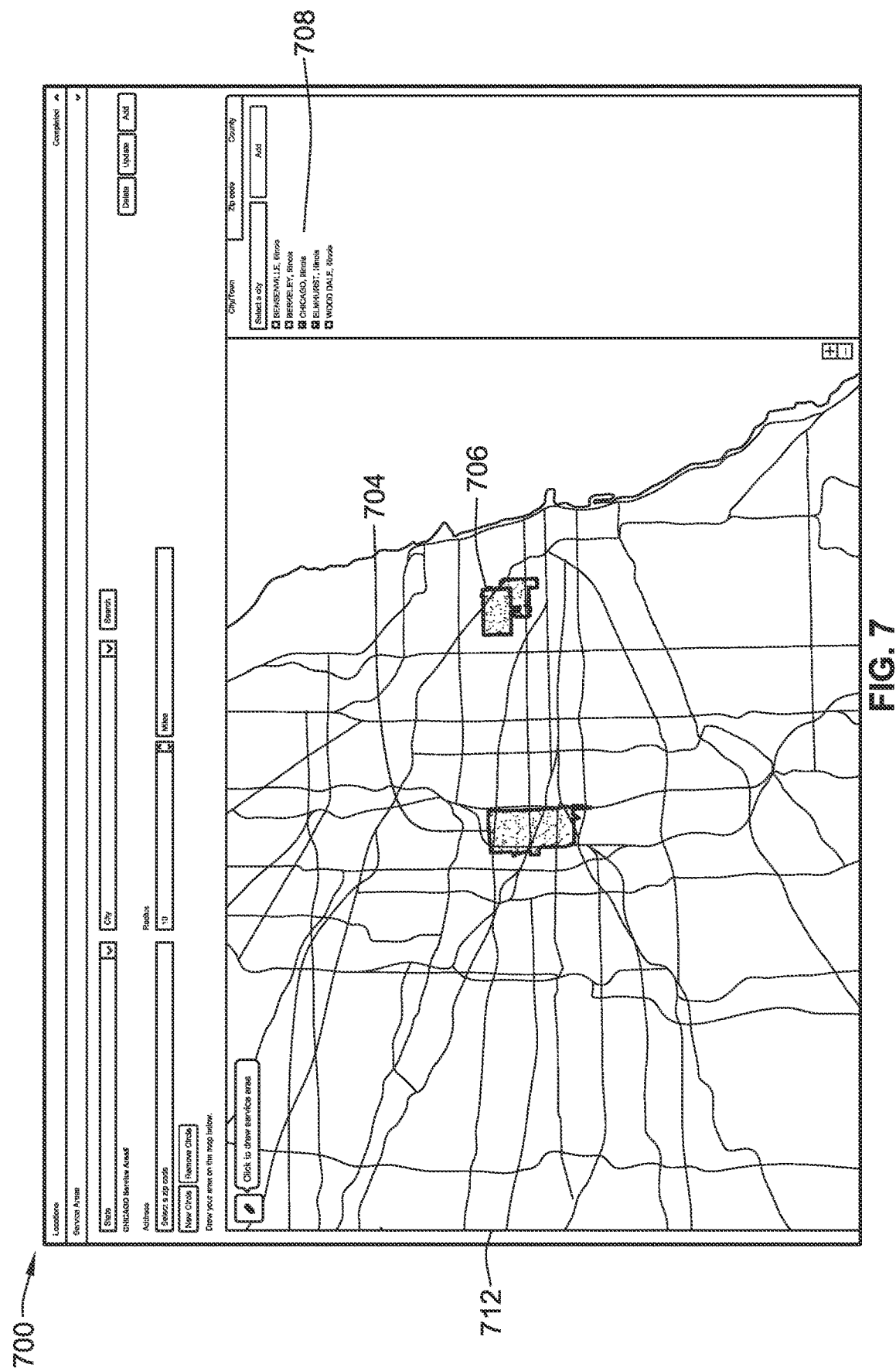
FIG. 7 depicts a user interface 700 including an interactive map 712 in which a user has deselected an indication of a location associated with a location identifier, according to some embodiments.

FIG. 7 depicts a user interface 700 including an interactive map 712 in which a user has deselected an indication of a location associated with a location identifier, according to some embodiments. As depicted in FIG. 7, the user has deselected the cities and/or towns of Bensenville, Ill., Berkley, Ill., and Wood Dale, Ill. via toggles 708. Based on this deselection, a location identifiers presentation is updated. Specifically, one or more of a first region 704 and a second region 706 are updated to no longer include the deselected cities and/or towns.

Figure 8:
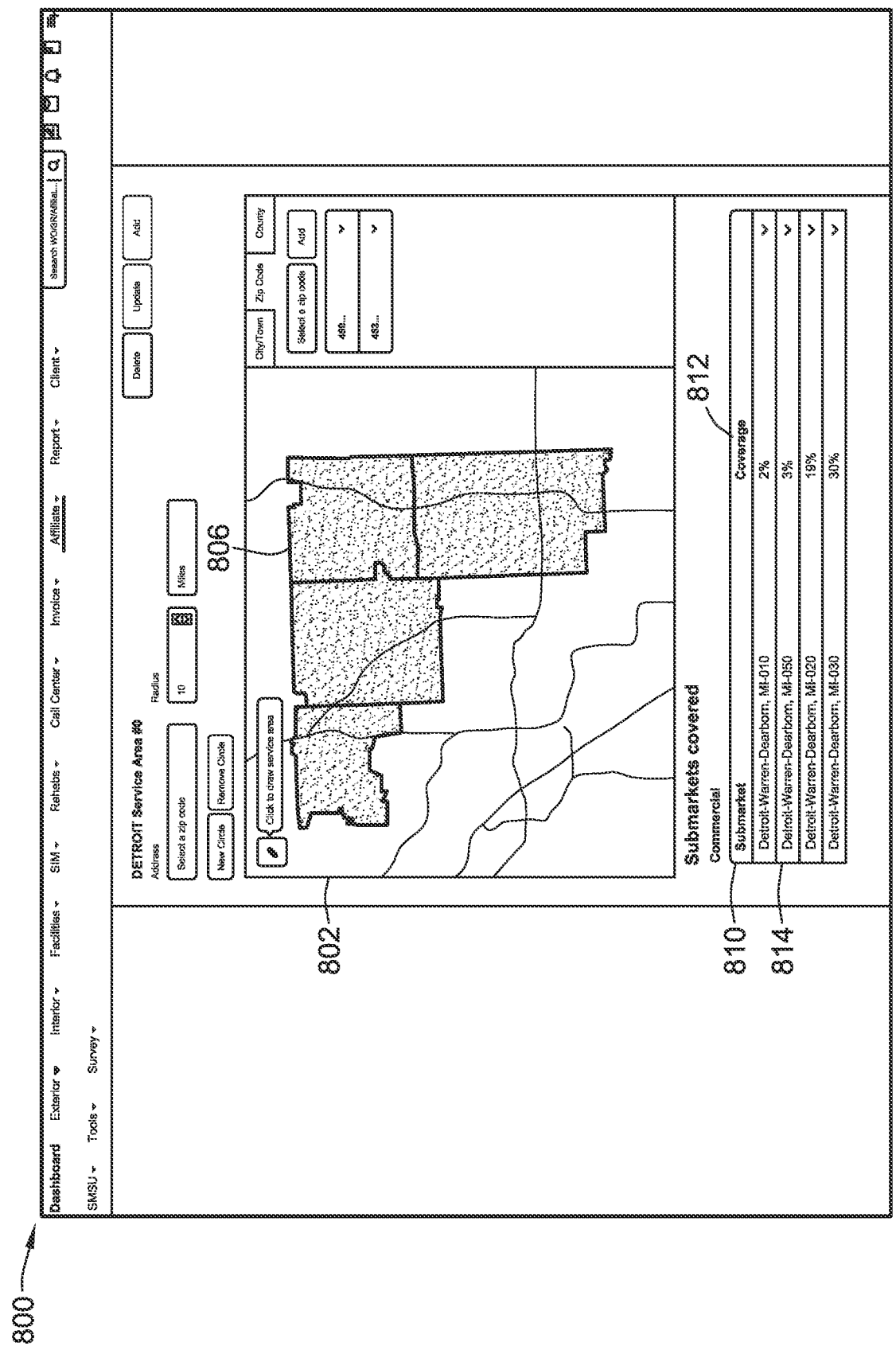
FIG. 8. depicts a user interface 800 including an interactive map 802, a location identifiers presentation 806, and a submarket menu 810, according to some embodiments.

FIG. 8. depicts a user interface 800 including an interactive map 802, a location identifiers presentation 806, and a submarket menu 810, according to some embodiments. The location identifier presentation 806 has been generated based on a boundary shape provided by the user. In some embodiments, the system can divide location identifiers into submarkets 814. In one embodiment, the submarkets 814 are collection of location identifiers. Such a division is depicted in the submarkets menu 810. The submarkets menu 810 includes a plurality of submarkets 814 and coverage indicators 812 associated with each of the submarkets 814. As depicted in FIG. 8, the user interface 800 includes four submarkets 814. The coverage indicators 812 indicate the portion of the submarket covered by the boundary shape drawn by the user. For example, boundary shape drawn by the user includes 2% of the location identifiers associated with the first submarket 814 (i.e., "Detroit-Warren-Dearborn, MI-010"). That is, 2% of the location identifiers associated with the first submarket 814 "Detroit-Warren-Dearborn, MI-010" are included within the boundary shape drawn by the user. As another example, 36% of the location identifiers associated with the fourth submarket 814 (i.e., "Detroit-Warren-Dearborn, MI-030") are included in the boundary shape drawn by the user. In some embodiments, the system can intelligently make suggestions to the user based on the coverage of each of the submarkets. For example, the system could suggest that the user add the remaining location identifiers for the fourth submarket 814 to achieve 100% coverage of the fourth submarket, as the user's boundary shape already covers 36% of the location identifiers associated with the fourth submarket 814.

Figure 9:
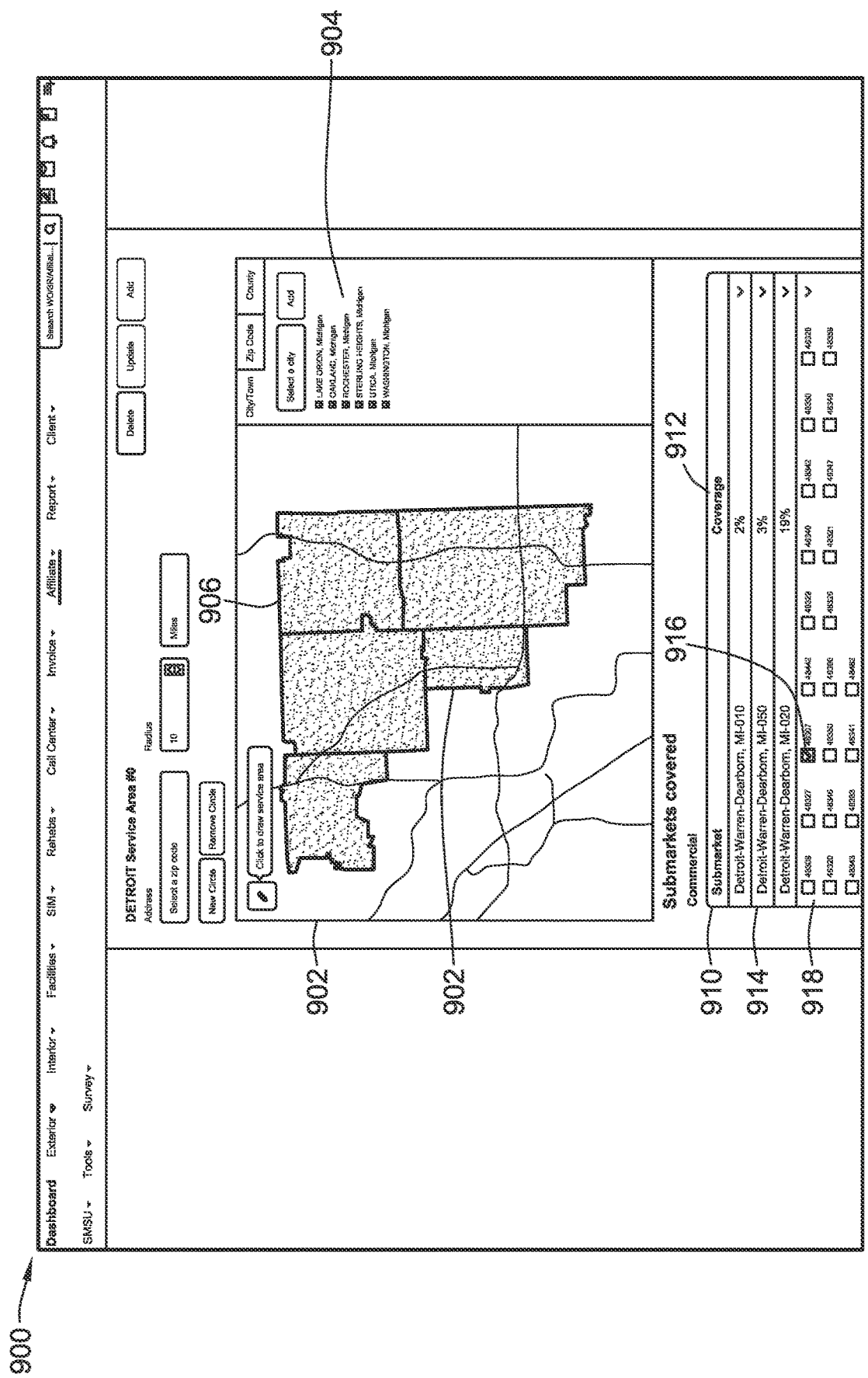
FIG. 9 depicts a user interface 900 including an interactive map 902 and a location identifiers presentation 906 after a user has selected an additional location identifier to add to a location identifiers presentation 906, according to some embodiments.
Figure 10:
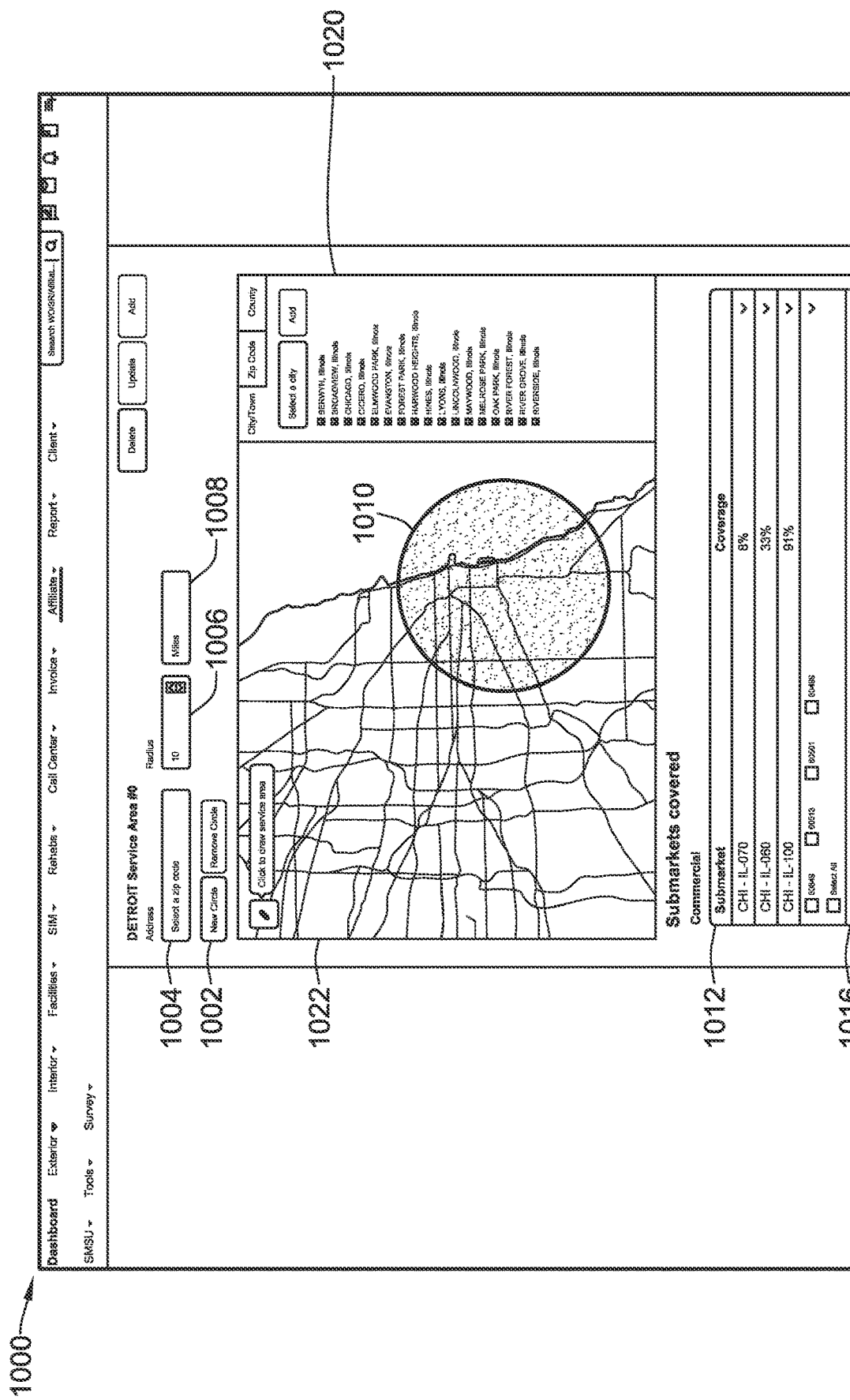
FIG. 10 depicts a user interface 1000 including an interactive map 1022 including a boundary shape 1010 based on a user-defined radius, according to some embodiments.

FIG. 9 depicts a user interface 900 including an interactive map 902 and a location identifiers presentation 906 after a user has selected an additional location identifier to add to a location identifiers presentation 906, according to some embodiments. As shown in FIG. 9, the user has expanded a section of a submarkets menu 910 associated with a third submarket 914 (i.e., the submarket 914 "Detroit-Warren-Dearborn, MI-020"). Once the submarkets menu 910 is expanded, it depicts each location identifier 918 in the fourth submarket that is not included based on the boundary shape drawn by the user (or in the location identifiers presentation 906). Each of the location identifiers 918 not included in the fourth submarket 914 includes a selectable element. Selection of a selectable element causes an area associated with the location identifier 918 corresponding to the selected selectable element to be included in the location identifiers presentation 906. As depicted in FIG. 9, the user has selected the selectable element 916 associated with the location identifier "48307" 916. Accordingly, as compared to the user interface depicted in FIG. 8, the location identifiers presentation 906 in FIG. 9 includes a section 908 associated with the location identifier "48370" 916. As depicted in FIG. 10, in some embodiments, the submarkets menu 910 can include a "select all" selectable element (indicated by reference numeral 1016 in FIG. 10). Selection of the "select all" selectable element causes all location identifiers listed in the submarkets menu 910 and associated with the corresponding submarket 914 to be added to the location identifiers presentation 906.

While the discussion of FIGS. 1-9 describes augmentation of an interactive map based on boundaries drawn by a user, the discussion of FIG. 10 describes augmentation of an interactive map based on a user selected radius.

FIG. 10 depicts a user interface 1000 including an interactive map 1022 including a boundary shape 1010 based on a user-defined radius, according to some embodiments. The user interface depicted in FIG. 10 includes the interactive map 1022, the boundary shape 1010, boundary selections (i.e., an address selection 1004, a radius selection 1006, and a unit selection 1008), a submarkets menu 1012, and a location identifiers selection area 1020. As opposed to, or in addition to, a user drawing boundaries to form a boundary shape, as depicted in FIG. 10, the user can create the boundary shape 1010 by specifying a point (e.g., an address, a latitude and longitude, a zip code, a city, a town, a county, a state, etc.) and a radius from the point. In such embodiments, the user has entered the zip code "60622" in the address selection 1004, the number "10" in the radius selection 1006, and a value of "miles" in the unit selection 1008. Accordingly, the boundary shape 1010 represents a radius of 10 miles from the zip code 60622. As discussed variously throughout, the user can select and/or deselect ones of the location identifiers to add, or remove, areas associated with location identifiers from the location identifiers presentation 1010. Additionally, the submarkets menu 1012 shows the user a coverage value for each location identifier in an associated submarket.

Figure 11:
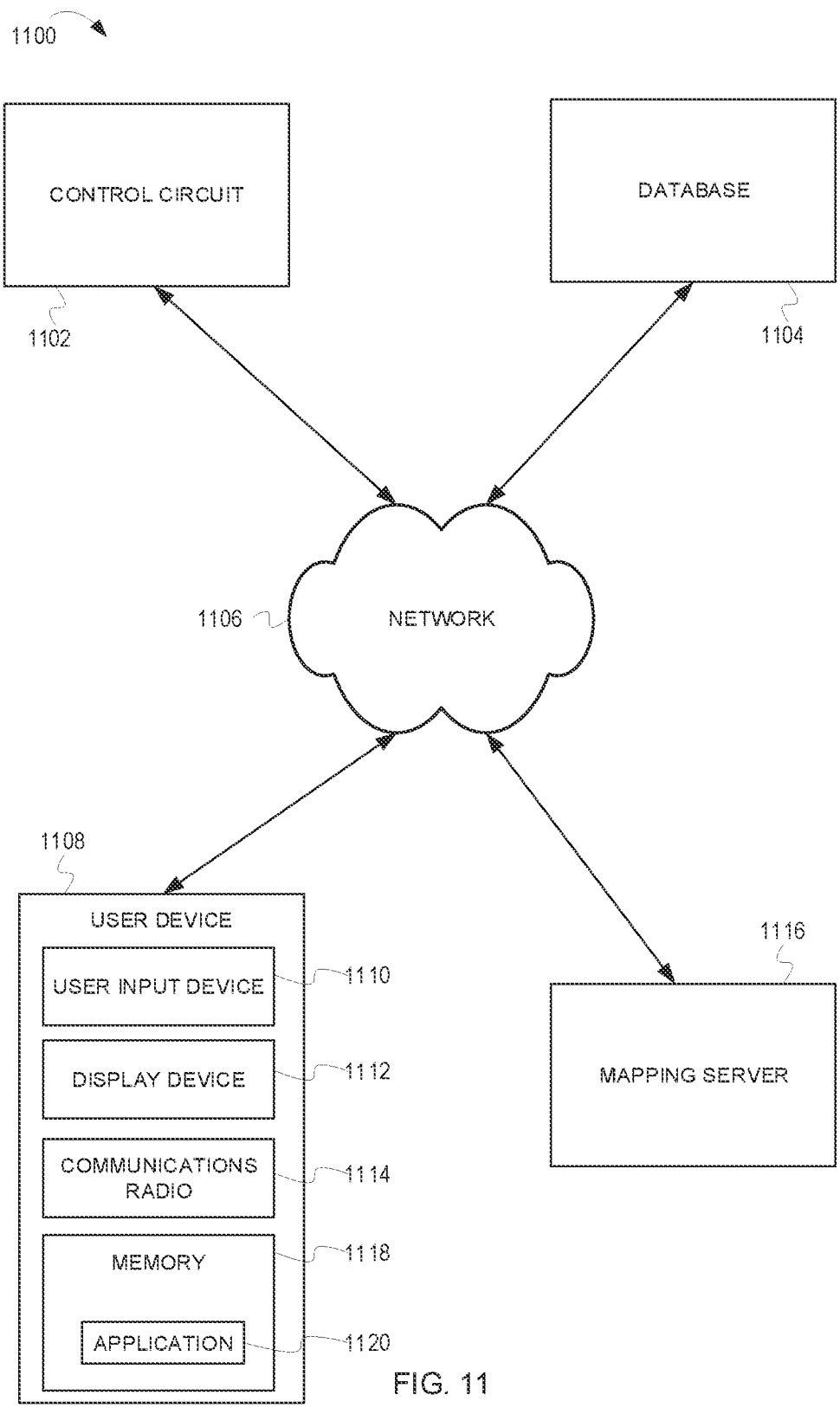
FIG. 11 is a block diagram of a system 1100 for generating service areas, according to some embodiments.

While the discussion of FIGS. 1-10 provides an overview of the functionality of systems, methods, and apparatuses for generating service areas, the discussion of FIG. 11 provides additional detail regarding such a system.

FIG. 11 is a block diagram of a system 1100 for generating service areas, according to some embodiment. The system 1100 includes a control circuit 1102, a database 1104, a network 1106 (e.g., a communications network), a user device 1108, and a mapping server 1116. One or more of the control circuit 1102, the database 1104, the user device 1108, and the mapping server 1116 are communicatively coupled via the network 1106. Accordingly, the network 1106 can take any suitable form and include wired and/or wireless links. For example, the network 1106 can include a local area network (LAN), a wide area network (WAN), such as the Internet, and/or a wireless wide area network (WWAN).

The database 1104 is configured to store location identifiers. The location identifiers can take any suitable form, such as zip codes, cities, counties, states, etc. The location identifiers are associated with geographic regions.

The mapping server 1116 includes map data. The map data is used to generate an interactive map. In some embodiments, the database 1104 and mapping server 1116 are resident on single hardware device (e.g., a server that houses the map data as well as the location identifiers).

The user device 1108 can be of any suitable type. For example, the user device 1108 can be a desktop computer, a laptop computer, a smartphone, a tablet computer, a personal digital assistance (PDA), a wearable smart device (e.g., a smartwatch), etc. The user device 1108 generally comprises a user input device 1110, a display device 1112, a communications radio 1114, a memory 1118, and, in some embodiments, an application 1120 stored in the memory 1118. The user input device 1110 is configured to receive user input (e.g., to make selections via a user interface). The user input device 1110 can include a keyboard, mouse, joystick, trackpad, stylus, keypad, scroll wheel, etc. A type of the user input device 1110 is dependent upon the type of the user device 1108. For example, if the user device 1108 is a desktop computer, the user input device 1110 may include a keyboard and mouse. The display device 1112 is configured to present a user interface. The user interface can include an interactive map, as well as any other suitable elements. The display device 1112 can take any suitable form, such as a cathode ray tube (CRT) display, a liquid crystal display (LCD), light emitting diode (LED) display, etc. In some embodiments, the user input device 1110 and the display device 1112 can be integrated into a single device, such as a touchscreen. The communications radio 1114 is configured to communicate with other components of the system 1100 via the network. The memory 1118 is configured to store data and/or computer executable code, such as the application 1120. In some embodiments, the user device 1108 executes the application 1120 to present the user interface, make selections from the user interface, and transmit/receive information to/from other components of the system 1100 via the network 1106.

The control circuit 1102 is generally configured to generate service areas. The control circuit 1102 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 1102 is configured (for example, by using corresponding programming as will be well understood by those skilled in the art) to carry out one or more of the steps, actions, and/or functions described herein.

By one optional approach the control circuit 1102 operably couples to a memory. The memory may be integral to the control circuit 1102 or can be physically discrete (in whole or in part) from the control circuit 1102 as desired. This memory can also be local with respect to the control circuit 1102 (where, for example, both share a common circuit board, chassis, power supply, and/or housing) or can be partially or wholly remote with respect to the control circuit 1102 (where, for example, the memory is physically located in another facility, metropolitan area, or even country as compared to the control circuit 1102).

This memory can serve, for example, to non-transitorily store the computer instructions that, when executed by the control circuit 1102, cause the control circuit 1102 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 1102 generates a user interface. The user interface includes an interactive map, as well as any desired content associated with the generation of service areas. The control circuit 1102 receives user input (e.g., from the user device 1108) and generates a boundary shape based on the input received. The control circuit 1102 augments the interactive map to include the boundary shape. The control circuit 1102 determines location identifiers associated with the boundary shape. For example, location identifiers can be associated with the boundary shape based on their inclusion within the boundary shape. The control circuit 1102 determines the associated location identifiers based on accessing the database 1104 via the network 1106. The control circuit 1102 generates a location identifier presentation based on the location identifiers that are associated with the boundary shape. The control circuit 1102 augments the interactive map to include the location identifiers presentation and causes the interactive map, including the boundary shape and the location identifiers, to be presented by, for example, the display device 1112 of the user device 1108. It should be noted that, in some embodiments, one or more of the operations of the control circuit 1102 can be performed by the user device 1108. For example, the control circuit 1102 can be resident on the user device 1108.

Figure 12:
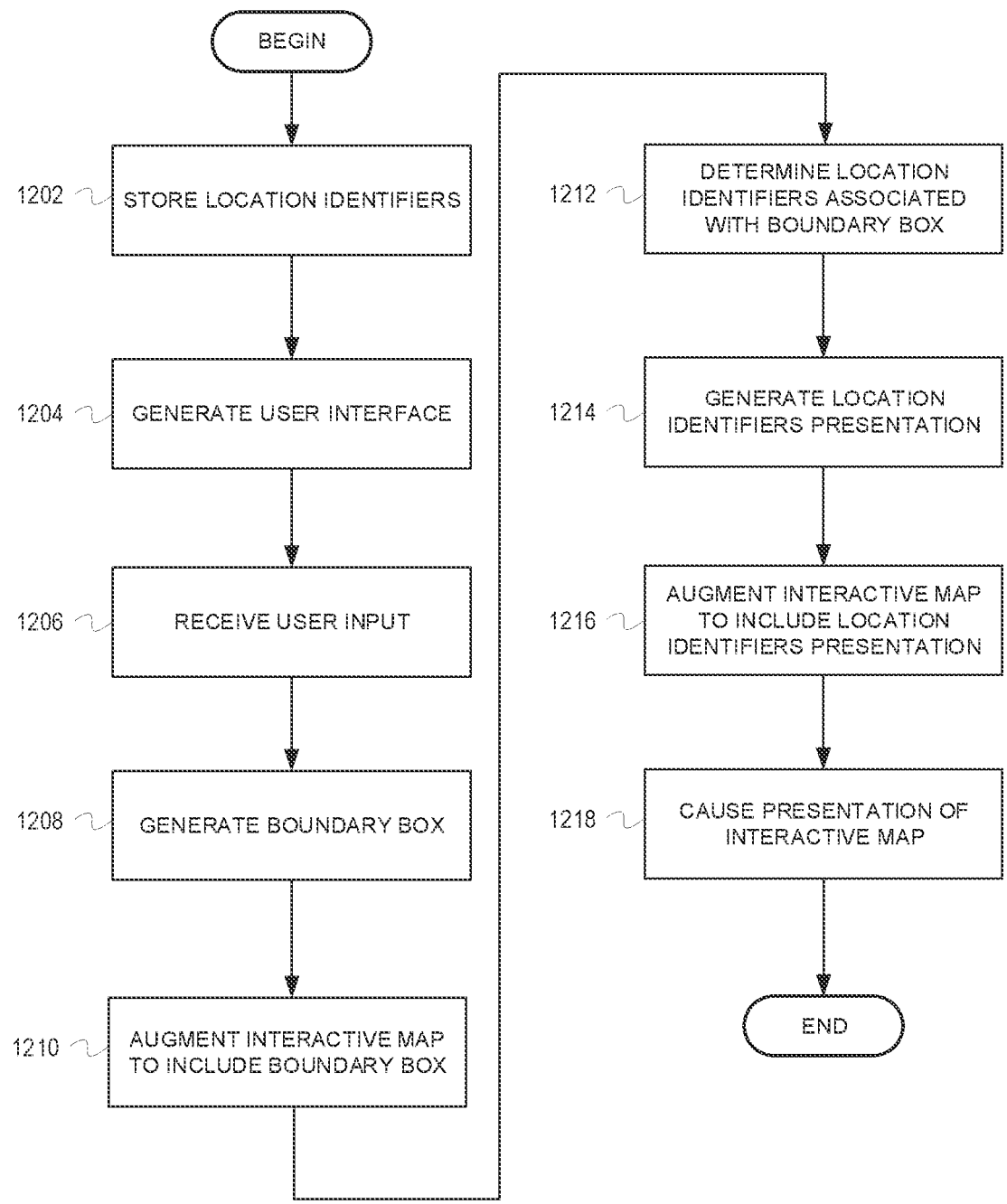
FIG. 12 is a flow chart depicting example operations for generating service areas, according to some embodiments.

While the discussion of FIG. 11 provides additional detail regarding a system for generating service areas, the discussion of FIG. 12 describes example operations of a such a system.

FIG. 12 is a flow chart depicting example operations for generating service areas, according to some embodiments. The flow starts at block 902.

At block 1202, location identifiers are stored. For example, a database can store the location identifiers. The location identifiers can take any suitable form. For example, the location identifiers can be zip codes, cities, counties, states, etc. The flow continues at block 1204.

At block 1204, a user interface is generated. For example, a control circuit can generate the user interface. The user interface includes an interactive map. The flow continues at block 1206.

At block 1206, user input is received. For example, the control circuit can receive the user input. The user input can be received, for example, by a user input device of a user device and transmitted to the control circuit. The user input indicates boundaries. In some embodiments, the boundaries are within the interactive map. The user input represents unstructured geospatial information (i.e., the boundaries as drawn by the user). The flow continues at block 111208.

At block 111208, a boundary shape is generated. For example, the control circuit can generate the boundary shape. The boundary shape is generated based on the user input (i.e., the indications of the boundaries). The boundary shape is a visual representation of the unstructured geospatial information provided by the user. The flow continues at block 141210.

At block 1210 the interactive map is augmented to include the boundary shape. For example, the control circuit can augment the interactive map to include the boundary shape. The flow continues at block 1212.

At block 1212, location identifiers associated with the boundary shape are determined. For example, the control circuit can determine the location identifiers that are associated with the boundary shape by accessing the database. Whether a location identifier is associated with the boundary shape can be based on any desired criteria. For example, a location identifier can be associated with the boundary shape based on its inclusion within the boundary shape 406, a threshold portion of a region associated with location identifier being within the boundary shape 406 (e.g., greater than 25% of the location identifier within the boundary shape, greater than 50% of the location identifier with the boundary shape 406, etc.), a proximity of the location identifier to the boundary shape (e.g., within two blocks of the boundary shape 406, within one mile of the boundary shape, etc.), etc. The location identifiers associated with the boundary shape represent structured geospatial information that is based on the unstructured geospatial information provided by the user. When determining the location identifiers associated with the boundary shape, the control circuit translates or converts the unstructured geospatial information provided by the user into structured geospatial information. An example of this conversion of data is described with respect to FIG. 13. In some embodiments, the control circuit translates or converts the unstructured geospatial information into structured geospatial information in real, or near real, time. The flow continues at block 1214.

At block 1214, a location identifiers presentation is generated. For example, the control circuit can generate the location identifiers presentation. The location identifiers presentation includes regions associated with the location identifiers associated with the boundary shape. The location identifiers presentation is a visual representation of the structured geospatial information. The flow continues at block 1216.

At block 1216, the interactive map is augmented to include the location identifiers presentation. For example, the control circuit can augment the interactive map to include the location identifiers presentation. The flow continues at block 111218.

At block 111218, presentation of the interactive map is caused. For example, the control circuit can cause presentation of the interactive map via a display device of the user device. In one embodiment, the control circuit causes presentation of the interactive map by generating commands, which when executed by the user device, present the interactive map.

It should be noted that, in some embodiments, after the interactive map is presented, the user can provide input affirming a selection of the service area. Such input can trigger, for example, the generation of a contract including the service area and/or services provided for the one or more service areas.

Figure 13:
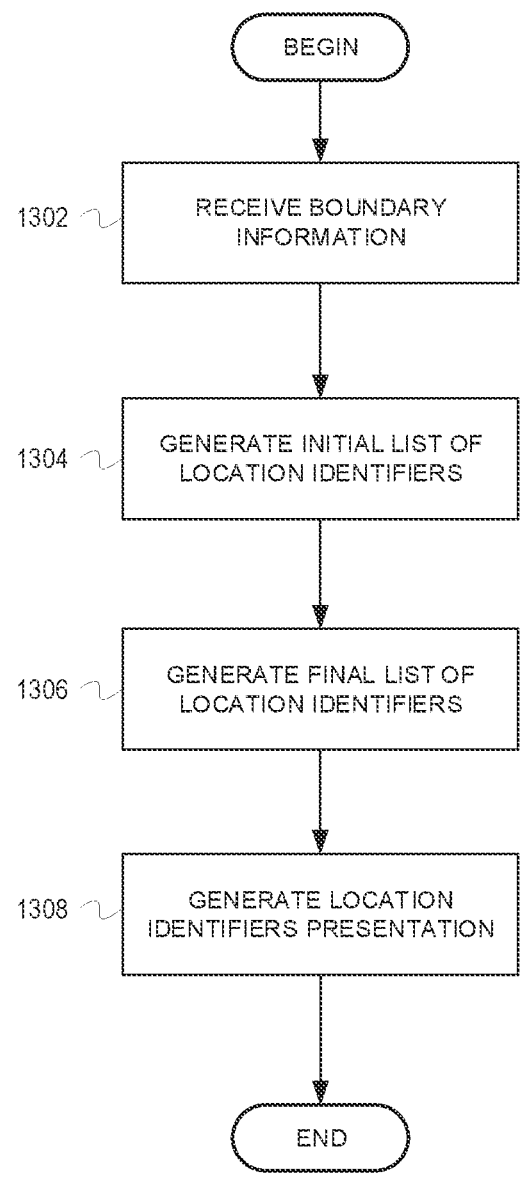
FIG. 13 is a flowchart depicting example operations for generating service areas, according to some embodiments.

FIG. 13 is a flowchart depicting example operations for generating service areas, according to some embodiments. The flow begins at block 1302.

At block 1302, boundary information is received. For example, a control circuit can receive boundary information from a user device. The boundary information can be of any suitable type. For example, the boundary information can be based on boundaries drawn, a radius selected, a geographic region, etc. The boundary information can be selected manually by a user or automatically by the system based on user inputs and/or information known about the user. The boundary information can, in some embodiments, be used to generate a boundary shape. The flow continues at block 1304.

At block 1304, an initial list of location identifiers is generated. For example, the control circuit can generate the initial list of location identifiers. The location identifiers are structured geospatial information associated with a geographic region. In one embodiment, the initial location identifiers list includes those location identifiers that are associated with the boundary information. For example, the initial location identifiers list can be generated by determining which location identifiers include points within the boundary information. For example, if a value associated with a location identifier (e.g., a coordinate, latitude/longitude, point, address, etc.) contained within a location identifier falls within the boundary information, that location identifier is included in an initial list of location identifiers. This can be determined by assessing values (e.g., a coordinate, latitude/longitude, point, address, etc.) associated with each vertex and/or border of the boundary information and comparing them to the values associated with the location identifier. The flow continues at block 1306.

At block 1306, a final list of location identifiers is generated. For example, the control circuit can generate the final list of location identifiers. Once the initial list of location identifiers is generated, the initial list of location identifiers is refined into a final location identifiers list. This refining process can be performed based on any suitable algorithm. As a simple example, a threshold algorithm can be applied to each location identifier in the initial list of location identifiers. The threshold algorithm calculates if a certain portion of the area associated with the location identifier is within the boundary information. For example, if a percentage of the area associated with the location identifier within the boundary information is above a threshold, that location identifier is kept in the final list of location identifiers. Conversely, if a percentage of the area associated with the location identifier is below the threshold, that location identifier is removed from the initial list of location identifiers (i.e., is not maintained in the final list of location identifiers). In some embodiments, this threshold is user-adjustable and/or automatically adjustable. In the case of a user-adjustable threshold, the user can specify what threshold they would like to use. In the case of an automatically adjustable threshold, the system can dynamically vary the threshold (e.g., for all of the location identifiers, some of the location identifiers, with different values for different ones of the location identifiers, etc.). For example, in a rural region, even though the percentage of the area associated with a location identifier may be below an initial threshold, the threshold may be adjusted down if the population associated with that location identifier is relatively low and would cause little extra burden on the service provider. In some embodiments, the system can remove location identifiers that fail to meet other criteria. For example, if the user is licensed only in Geographic Region A (e.g., a first state) and one of the location identifiers is in Geographic Region B (e.g., a second state), the system can exclude that location identifier even is the location identifier would otherwise be included based on a threshold or some other criteria. Accordingly, the inclusion of location identifiers can be based on a hierarchy dependent upon the circumstances for inclusion or exclusion. The flow continues at block 1308.

At block 1038, a location identifiers presentation is generated. For example, the control circuit can generate the location identifiers presentation. Additionally, the location identifiers presentation can be augmented onto a map. In one embodiment, the location identifier presentation is augmented onto the map by drawing regions associated with each of the location identifiers based on values (e.g., a coordinate, latitude/longitude, point, address, etc.) associated with the location identifiers.

Figure 14:
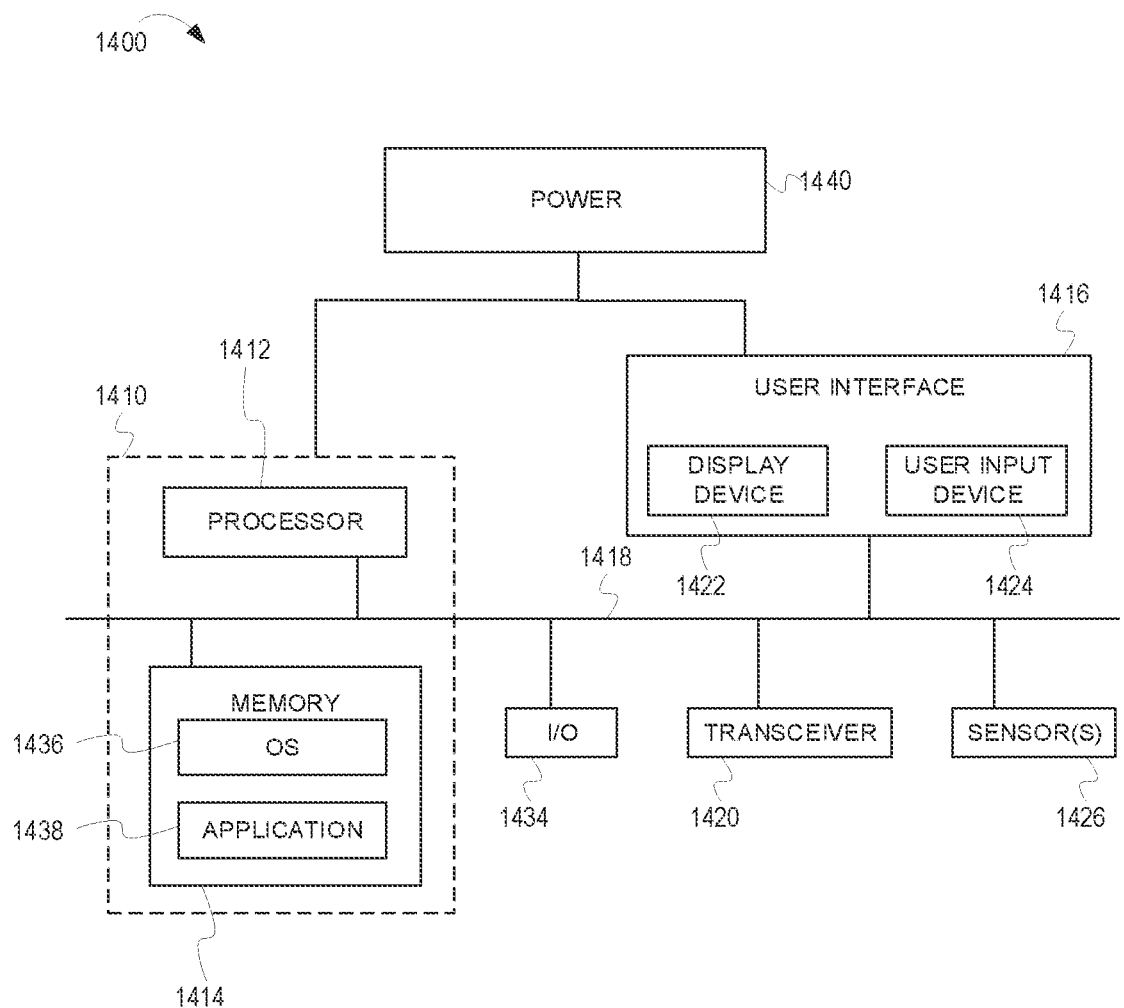
FIG. 14 is a block diagram of a system 1400 that may be used for implementing any of the components, circuits, circuitry, systems, functionality, apparatuses, processes, or devices of the system 1100 of FIG. 11, according to some embodiments.

While the discussion of FIGS. 12 and 13 provides additional detail regarding example operations of a system for generating service areas, the discussion of FIG. 14 provides additional detail regarding components described herein.

FIG. 14 is a block diagram of a system 1400 that may be used for implementing any of the components, circuits, circuitry, systems, functionality, apparatuses, processes, or devices of the system 1100 of FIG. 11, and/or other above or below mentioned systems or devices, or parts of such circuits, circuitry, functionality, systems, apparatuses, processes, or devices. The circuits, circuitry, systems, devices, processes, methods, techniques, functionality, services, servers, sources and the like described herein may be utilized, implemented and/or run on many different types of devices and/or systems. For example, the system 1400 may be used to implement some or all of the control circuit, database, user device, mapping server, and/or other such components, circuitry, functionality and/or devices. However, the use of the system 1400 or any portion thereof is certainly not required.

By way of example, the system 1400 may comprise a control circuit or processor 1412, memory 1414, and one or more communication links, paths, buses or the like 1418. Some embodiments may include one or more user interfaces 1416, and/or one or more internal and/or external power sources or supplies 1440. The control circuit 1412 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1412 can be part of control circuitry and/or a control system 1410, which may be implemented through one or more processors with access to one or more memory 1414 that can store commands, instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1400 may be used to implement one or more of the above or below, or parts of, components, circuits, systems, processes and the like.

The user interface 1416 can allow a user to interact with the system 1400 and receive information through the system. In some instances, the user interface 1416 includes a display device 1422 and/or one or more user input device 1424, such as buttons, touch screen, track ball, keyboard, mouse, etc., which can be part of or wired or wirelessly coupled with the system 1400. Typically, the system 1400 further includes one or more communication interfaces, ports, transceivers 1420 and the like allowing the system 1400 to communicate over a communication bus, a distributed computer and/or communication network (e.g., a local area network (LAN), wide area network (WAN) such as the Internet, etc.), communication link 1418, other networks or communication channels with other devices and/or other such communications or combination of two or more of such communication methods. Further the transceiver 1420 can be configured for wired, wireless, optical, fiber optical cable, satellite, or other such communication configurations or combinations of two or more of such communications. Some embodiments include one or more input/output (I/O) ports 1434 that allow one or more devices to couple with the system 1400. The I/O ports can be substantially any relevant port or combinations of ports, such as but not limited to USB, Ethernet, or other such ports. The I/O interface 1434 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1426 to provide information to the system and/or sensor information that is communicated to another component, such as the central control system, a delivery vehicle, etc. The sensors 1426 can include substantially any relevant sensor, such as distance measurement sensors (e.g., optical units, sound/ultrasound units, etc.), optical-based scanning sensors to sense and read optical patterns (e.g., bar codes), radio frequency identification (RFID) tag reader sensors capable of reading RFID tags in proximity to the sensor, imaging system and/or camera, other such sensors or a combination of two or more of such sensor systems. The foregoing examples are intended to be illustrative and are not intended to convey an exhaustive listing of all possible sensors. Instead, it will be understood that these teachings will accommodate sensing any of a wide variety of circumstances in a given application setting.

The system 1400 comprises an example of a control and/or processor-based system with the control circuit 1412. Again, the control circuit 1412 can be implemented through one or more processors, controllers, central processing units, logic, software and the like. Further, in some implementations the control circuit 1412 may provide multiprocessor functionality.

The memory 1414, which can be accessed by the control circuit 1412, typically includes one or more processor-readable and/or computer-readable media accessed by at least the control circuit 1412, and can include volatile and/or nonvolatile media, such as RAM, ROM, EEPROM, flash memory and/or other memory technology. Further, the memory 1414 is shown as internal to the control system 1410; however, the memory 1414 can be internal, external or a combination of internal and external memory. Similarly, some or all of the memory 1414 can be internal, external or a combination of internal and external memory of the control circuit 1412. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over a computer network. The memory 1414 can store code, software, executables, scripts, data, content, lists, programming, programs, log or history data, user information, customer information, product information, and the like. In some embodiments, the control circuit also includes an operating system 1436 and one or more applications 1438 stored in the memory 1414. While FIG. 14 illustrates the various components being coupled together via a bus, it is understood that the various components may actually be coupled to the control circuit and/or one or more other components directly.

In some embodiments, a system for generating service areas comprises a database, wherein the database is configured to store location identifiers, and a control circuit, wherein the control circuit is communicatively coupled to the database, and wherein the control circuit is configured to generate a user interface, wherein the user interface includes an interactive map, receive, from a user, first user input, wherein the first user input indicates boundaries drawn within the interactive map, generate, based on the first user input, a boundary shape, augment the interactive map to include the boundary shape, determine, based on accessing the database, one or more location identifiers associated with the first user input, generate, based on the first user input and the one or more location identifiers, a location identifiers presentation, augment the interactive map to include the location identifiers presentation, and cause presentation, via a display device, of the interactive map including the boundary shape and the location identifier presentation.

In some embodiments, an apparatus and a corresponding method performed by the apparatus, comprises storing, in a database, location identifiers, generating, by a control circuit, a user interface, wherein the user interface includes an interactive map, receiving, by the control circuit from a user, a first user input, wherein the first user input indicates boundaries drawn within the interactive map, generating, by the control circuit based on the first user input, a boundary shape, augmenting, by the control circuit, the interactive map to include the boundary shape, determining, by the control circuit based on accessing the database, one or more location identifiers associated with the first user input, generating, by the control circuit based on the first user input and the one or more location identifiers, a location identifiers presentation, augmenting, by the control circuit, the interactive map to include the location identifiers presentation, and causing presentation, via a display device, of the interactive map including the boundary shape and the location identifiers presentation.

Those skilled in the art will recognize that a wide variety of other modifications, alterations, and combinations can also be made with respect to the above described embodiments without departing from the scope of the disclosure, and that such modifications, alterations, and combinations are to be viewed as being within the ambit of the inventive concept.

What is claimed is:
1. A system for generating service areas, the system comprising:
a database, wherein the database is configured to store location identifiers, wherein the location identifiers are associated with geographic regions and comprise structured geospatial information; and
a control circuit, wherein the control circuit is communicatively coupled to the database, and wherein the control circuit is configured to:
generate a user interface, wherein the user interface includes an interactive map;
receive, from a user, first user input representing unstructured geospatial information, wherein the first user input indicates boundaries drawn within the interactive map;
generate, based on the first user input, a boundary shape;
augment the interactive map to include the boundary shape;
convert, based on accessing the database, the unstructured geospatial information to the structured geospatial information to determine one or more location identifiers associated with the first user input, wherein the control circuit converts the unstructured geospatial information to the structured geospatial information in one of real time and near real time;

generate, based on the first user input and the one or more location identifiers, a location identifiers presentation, wherein the location identifiers presentation includes geographic regions associated with the one or more location identifiers;

augment the interactive map to include the location identifiers presentation; and cause presentation, via a display device, of the interactive map including the boundary shape and the location identifiers presentation.

2. The system of claim 1, wherein location identifiers are one or more of zip codes, cities, counties, and states.

3. The system of claim 1, wherein the user interface further includes indications of locations associated with the one or more location identifiers.

4. The system of claim 3, wherein the control circuit is further configured to:

receive, from the user, second user input, wherein the second user input deselects one or more of the indications of locations associated with the one or more location identifiers; and update, based on the second user input, the interactive map to remove the one or more locations associated with the one or more location identifiers.

5. The system of claim 1, further comprising:

a user device, the user device comprising:

a user input device, wherein the user input device is configured to receive the first user input;

a communications radio, wherein the communications radio is configured to transmit the first user input to the control circuit and receive instructions for presenting the user interface from the control circuit; and the display device, wherein the display device is configured to present the user interface; and a communications network, wherein the communications network is communicatively coupled to the user device and the control circuit.

6. The system of claim 1, wherein the first user input does not define a closed boundary shape, the control circuit further configured to:

receive, from the user, second user input indicating completion of the first user input; and automatically generate one or more additional boundaries, wherein the one or more additional boundaries create the closed boundary shape.

7. The system of claim 1, wherein the boundaries include one or m ore of straight lines and curved lines.

8. A method of generating service areas, the method comprising:

storing, in a database, location identifiers, wherein the location identifiers are associated with geographic regions and comprise structured geospatial information;

generating, by a control circuit, a user interface, wherein the user interface includes an interactive map;

receiving, by the control circuit from a user, first user input representing unstructured geospatial information, wherein the first user input indicates boundaries drawn within the interactive map;

generating, by the control circuit based on the first user input, a boundary shape;

augmenting, by the control circuit, the interactive map to include the boundary shape;

converting, by the control circuit based on accessing the database, the unstructured geospatial information to the structured geospatial information to determine one or more location identifiers associated with the first user input, wherein the control circuit converts the unstructured geospatial information to the structured geospatial information in one of real time and near real time;

generating, by the control circuit based on the first user input and the one or more location identifiers, a location identifiers presentation, wherein the location identifiers presentation includes geographic regions associated with the one or more location identifiers;

augmenting, by the control circuit, the interactive map to include the location identifiers presentation; and causing presentation, via a display device, of the interactive map including the boundary shape and the location identifiers presentation.

9. The method of claim 8, wherein the location identifiers are one or more of zip codes, cities, counties, and states.

10. The method of claim 8, wherein the user interface further includes indications of locations associated with the one or more location identifiers.

11. The method of claim 10, further comprising:

receiving, by the control circuit from the user, second user input, wherein the second user input deselects one or more of the indications of locations associated with the one or more location identifiers; and updating, based on the second user input, the interactive map to remove the one or more locations associated with the one or more location identifiers.

12. The method of claim 8, further comprising:

receiving, via a user input device of a user device, the first user input;

transmitting, via a communications radio of the user device to the control circuit over a communications network, the first user input;

receiving, by the communications radio of the user device from the control circuit over the communications network, instructions for presenting the user interface; and presenting, via a display device of the user device, the user interface.

13. The method of claim 8, wherein the first user input does not define a closed boundary shape, the method further comprising:

receiving, by the control circuit from the user, second user input indicating completion of the first user input; and automatically generating, by the control circuit, one or more additional boundaries, wherein the one or more additional boundaries create the closed boundary shape.

14. A method of generating service areas, the method comprising:

generating, by the control circuit, a user interface, wherein the user interface includes an interactive map;

receiving, by the control circuit, boundary information, wherein the boundary information represents unstructured geospatial information;

converting, by the control circuit, the unstructured geospatial information to structured geospatial information, wherein the control circuit converts the unstructured geospatial information to the structured geospatial information in one of real time and near real time;

generating, by the control circuit based on the boundary information, an initial list of location identifiers, wherein the location identifiers are associated with geographic regions;

generating, by the control circuit based on the initial list of location identifiers, a final list of location identifiers;

generating, by the control circuit based on the final list of location identifiers, a location identifiers presentation, wherein the location identifiers presentation includes geographic regions associated with the location identifiers in the final list of location identifiers; and augmenting, by the control circuit, the interactive map to include the location identifiers presentation.

\* \* \* \* \*